(12) United States Patent
Noh (10) Patent No.: US 6,711,512 B2
(45) Date of Patent: Mar. 23, 2004

(54) POLE TRANSFORMER LOAD MONITORING SYSTEM USING WIRELESS INTERNET NETWORK

(75) Inventor: Seung-Man Noh, Puchon-Si (KR)

(73) Assignee: Korea Electric Power Data Network Co. Ltd., Seoul (KR)

( * ) Notice: Subject to any disclaimer, the term of this patent is extended or adjusted under 35 U.S.C. 154(b) by 143 days.

(21) Appl. No.: 10/035,725

(22) Filed: Nov. 7, 2001

(65) Prior Publication Data
US 2003/0033119 A1 Feb. 13, 2003

(30) Foreign Application Priority Data
Aug. 7, 2001 (KR) ........................................ 2001-47526

(51) Int. Cl.[7] .............................................. G06F 19/00
(52) U.S. Cl. ........................................ 702/65; 324/126
(58) Field of Search ............................. 702/65, 188, 58, 702/34; 700/286; 323/257; 361/25, 62; 324/72, 42, 126, 142, 424, 107, 127, 135, 522, 103 R, 713, 86, 117 R, 73.1, 772; 340/310.02; 363/37; 96/24

(56) References Cited

U.S. PATENT DOCUMENTS

| | | | |
|---|---|---|---|
| 3,673,585 A | | 6/1972 | Tripp et al. ................. 340/198 |
| 5,426,360 A | * | 6/1995 | Maraio et al. ............... 324/126 |
| 5,982,645 A | * | 11/1999 | Levran et al. ................. 363/37 |
| 6,056,808 A | * | 5/2000 | Krause ............................ 96/24 |
| 6,169,648 B1 | * | 1/2001 | Denvir et al. .................. 361/25 |
| 6,545,482 B1 | * | 4/2003 | Fedirchuk et al. .......... 324/522 |

FOREIGN PATENT DOCUMENTS

| | | |
|---|---|---|
| GB | 295570 | 10/1928 |
| GB | 398087 | 9/1933 |

* cited by examiner

*Primary Examiner*—John Barlow
*Assistant Examiner*—Xiuqin Sun
(74) *Attorney, Agent, or Firm*—Seth Natter; Natter & Natter

(57) ABSTRACT

The present invention relates to a pole transformer load monitoring system using a wireless Internet network. The load monitoring system is capable of measuring, in real time, a variety of load parameters (phase voltages, phase currents and temperatures) of a pole transformer placed on a distribution line. The results of the measurements are transferred to an operator in a branch operating station over the wireless Internet network so as to prevent losses resulting from overloaded and unbalanced states, thereby enhancing the quality of power supply and efficiently managing a distribution load.

5 Claims, 5 Drawing Sheets

POLE TRANSFORMER LOAD MONITORING SYSTEM USING WIRELESS INTERNET NETWORK

BACKGROUND OF THE INVENTION

1. Field of the Invention

The present invention relates to a pole transformer load monitoring system using a wireless Internet network, and more particularly to a pole transformer load monitoring system using a wireless Internet network, which is capable of measuring a variety of loads (phase voltages, phase currents and temperatures) of a pole transformer placed on a distribution line in real time and transferring the results of the measurements to an operator in a branch operating station over the wireless Internet network so as to prevent losses resulting from overloaded and unbalanced states, thereby enhancing the quality of power supply and efficiently managing a distribution load.

2. Description of the Related Art

An example of conventional pole transformer load monitoring systems is shown in Korean Utility Model Publication No. 20-0174398 (published on Dec. 28, 1999).

Figure 1:
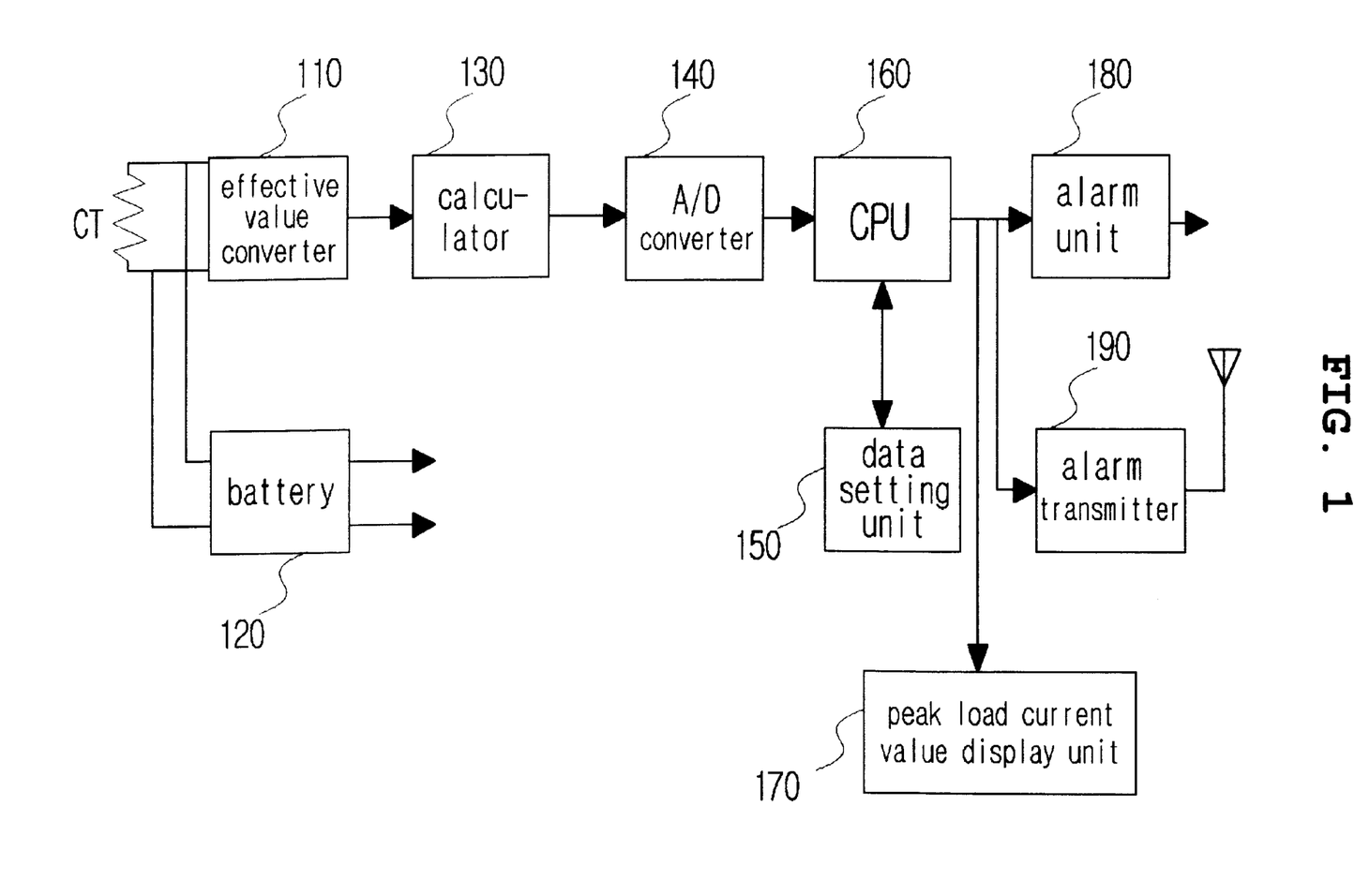
FIG. 1 is a block diagram schematically showing the construction of a conventional pole transformer load monitoring system.

FIG. 1 is a block diagram showing the construction of a pole transformer load monitoring system disclosed in the '398 publication. As shown in this drawing, the pole transformer load monitoring system comprises an effective value converter 110 for converting current detected by a current transformer CT into an effective voltage, a battery 120 for charging and discharging itself with the current detected by the current transformer CT, a calculator 130 for amplifying the effective voltage from the effective value converter 110 and adjusting the gain of the amplified voltage, an analog/digital (A/D) converter 140 for converting an analog voltage from the calculator 130 into a BCD-coded digital signal, a data setting unit 150 for presetting a threshold value of overload current of a pole transformer, and a central processing unit (CPU) 160 operated according to a given program. In a normal state, the CPU 160 BCD-codes a peak load current value and continuously displays the coded value on a peak load current value display unit 170. The CPU 160 also continuously monitors whether a currently measured peak load current value of the pole transformer exceeds the overload current threshold value preset by the data setting unit 150. At the time that the currently measured peak load current value exceeds the preset overload current threshold value, the CPU 160 outputs an alarm control signal to an alarm unit 180 and an alarm transmission control signal to an alarm transmitter 190, respectively. The peak load current value display unit 170 acts to display the peak load current value coded by the CPU 160 on a liquid crystal display (LCD). When the currently measured peak load current value of the pole transformer exceeds the preset overload current threshold value, the alarm unit 180 flickers or lights up an alarm indication lamp and rings a buzzer, in response to the alarm control signal from the CPU 160. At this time, the alarm transmitter 190 transmits an overload alarm signal to a ground portable receiver in response to the alarm transmission control signal from the CPU 160.

However, the above-mentioned conventional pole transformer load monitoring system has a disadvantage in that it cannot monitor hystereses of loads, such as phase voltages and phase currents, in real time because it uses no wireless Internet network. This makes it impossible to efficiently manage the demand for electricity as well as to practically provide upgraded and advanced versions of electrical products.

SUMMARY OF THE INVENTION

Therefore, the present invention has been made in view of the above problems, and it is an object of the present invention to provide a pole transformer load monitoring system using a wireless Internet network, which is capable of monitoring phase voltages, phase currents, an internal temperature of a system body and an external temperature of a pole transformer in real time.

It is another object of the present invention to provide a pole transformer load monitoring system using a wireless Internet network, which is capable of providing current and voltage load factors by time zones.

It is a further object of the present invention to provide a pole transformer load monitoring system using a wireless Internet network, which is capable of outputting an alarm to a personal computer (PC) of a manager and a central control station at the time that a pole transformer is overloaded.

It is a further object of the present invention to provide a pole transformer load monitoring system using a wireless Internet network, which is capable of providing an indication of only an overloaded pole transformer.

It is another object of the present invention to provide a pole transformer load monitoring system using a wireless Internet network, which is capable of, when a pole transformer is overloaded, readily providing transformer information (light-loaded transformer information, overloaded transformer information, daily information, monthly information, quarterly information and yearly information).

It is yet another object of the present invention to provide a pole transformer load monitoring system using a wireless Internet network, which is capable of tracking an accurate fault point on a distribution line to shorten a recovery time.

In accordance with the present invention, the above and other objects can be accomplished by the provision of a pole transformer load monitoring system using a wireless Internet network, comprising phase current detection means for detecting current of each phase flowing through a secondary coil of a pole transformer; phase voltage detection means for detecting a voltage of each phase induced in the secondary coil of the pole transformer; internal temperature detection means for detecting an internal temperature of a system body; external temperature detection means for detecting an external temperature of the pole transformer; an analog/digital converter for converting the phase current detected by the phase current detection means, the phase voltage detected by the phase voltage detection means, the internal temperature detected by the internal temperature detection means and the external temperature detected by the external temperature detection means into digital signals; a microprocessor for performing an arithmetic operation for digital phase current, phase voltage, internal temperature and external temperature data from the analog/digital converter and controlling the entire operation of the system; a flash read only memory for sequentially storing phase current, phase voltage, internal temperature and external temperature values measured as a result of the arithmetic operation of the microprocessor; a watchdog for monitoring from periodic output signals from the microprocessor whether the microprocessor operates normally and outputting a reset signal to the microprocessor and flash read only memory upon determining that the microprocessor does not operate normally; a buffer for buffering an address signal from the microprocessor; a random access memory for storing output data from the microprocessor in its location corresponding to the address signal buffered by the buffer; a modem for receiving an output signal from the microprocessor, transmitting the received signal to a central control station via a base station and Internet network, receiving a control signal transmitted from the central control station and transferring the received control signal to the microprocessor; indication means for providing a visual indication of the transmission of the output signal from the microprocessor via the modem and a visual indication of the reception of the control signal from the central control station by the microprocessor; and an alternating current (AC)/direct current (DC) converter for converting an AC voltage applied between any one of three phases of the pole transformer and a neutral line into a DC voltage of a certain level and outputting the converted DC voltage as an operating voltage.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 2:
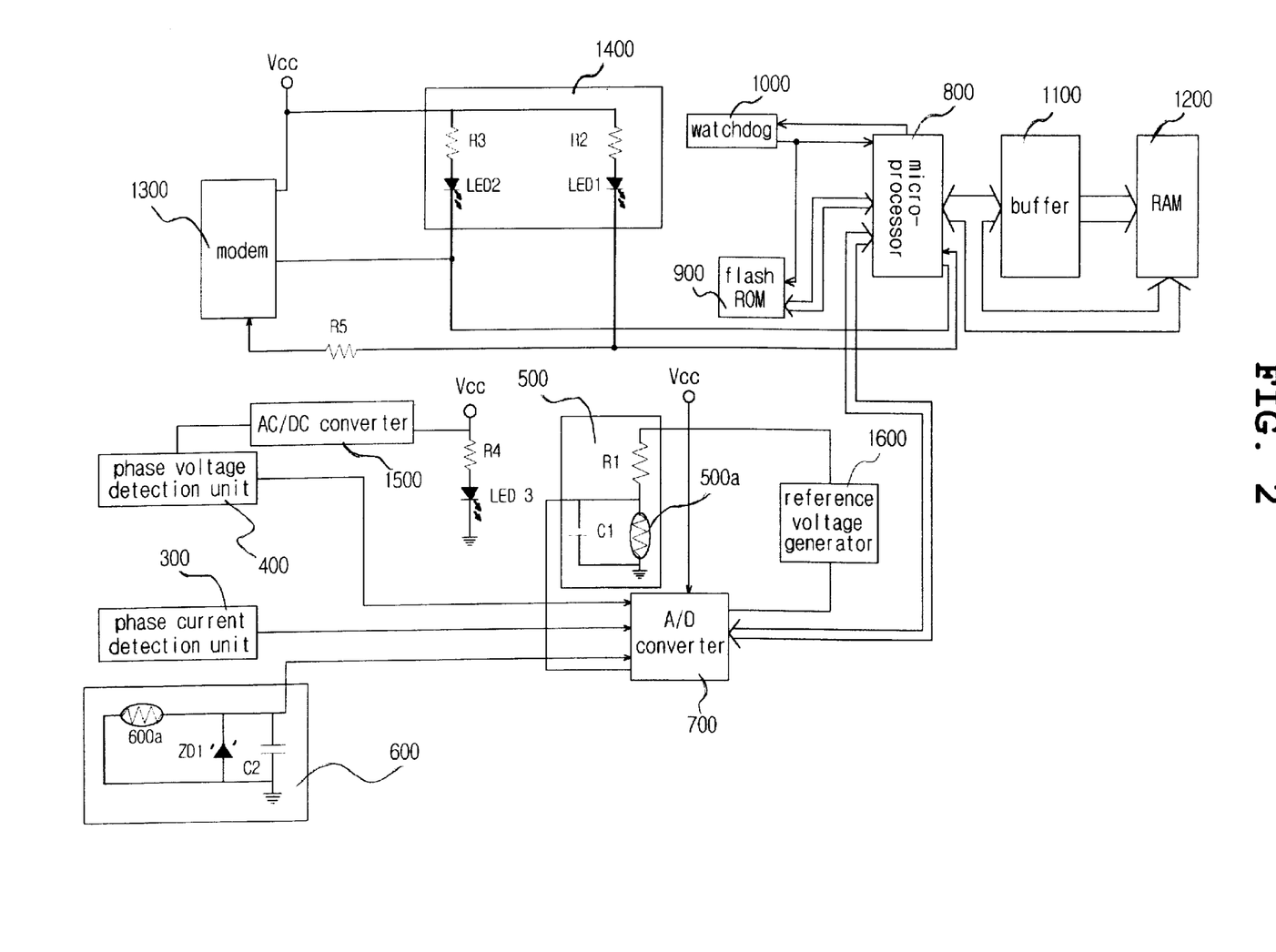
FIG. 2 is a block diagram schematically showing the construction of a pole transformer load monitoring system using a wireless Internet network in accordance with a preferred embodiment of the present invention.
Figure 3:
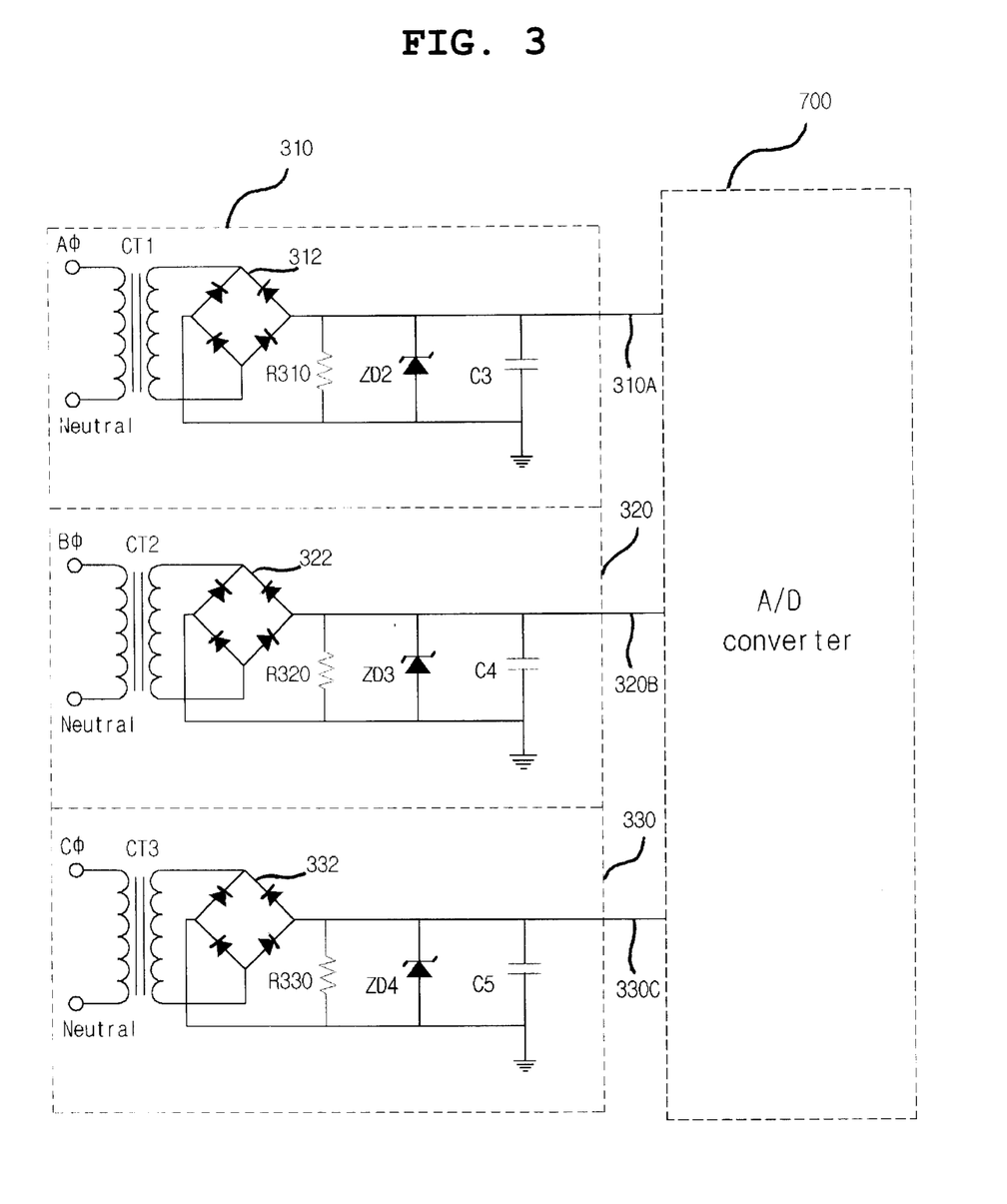
FIG. 3 is a detailed circuit diagram of a phase current detection unit in FIG. 2.
Figure 4:
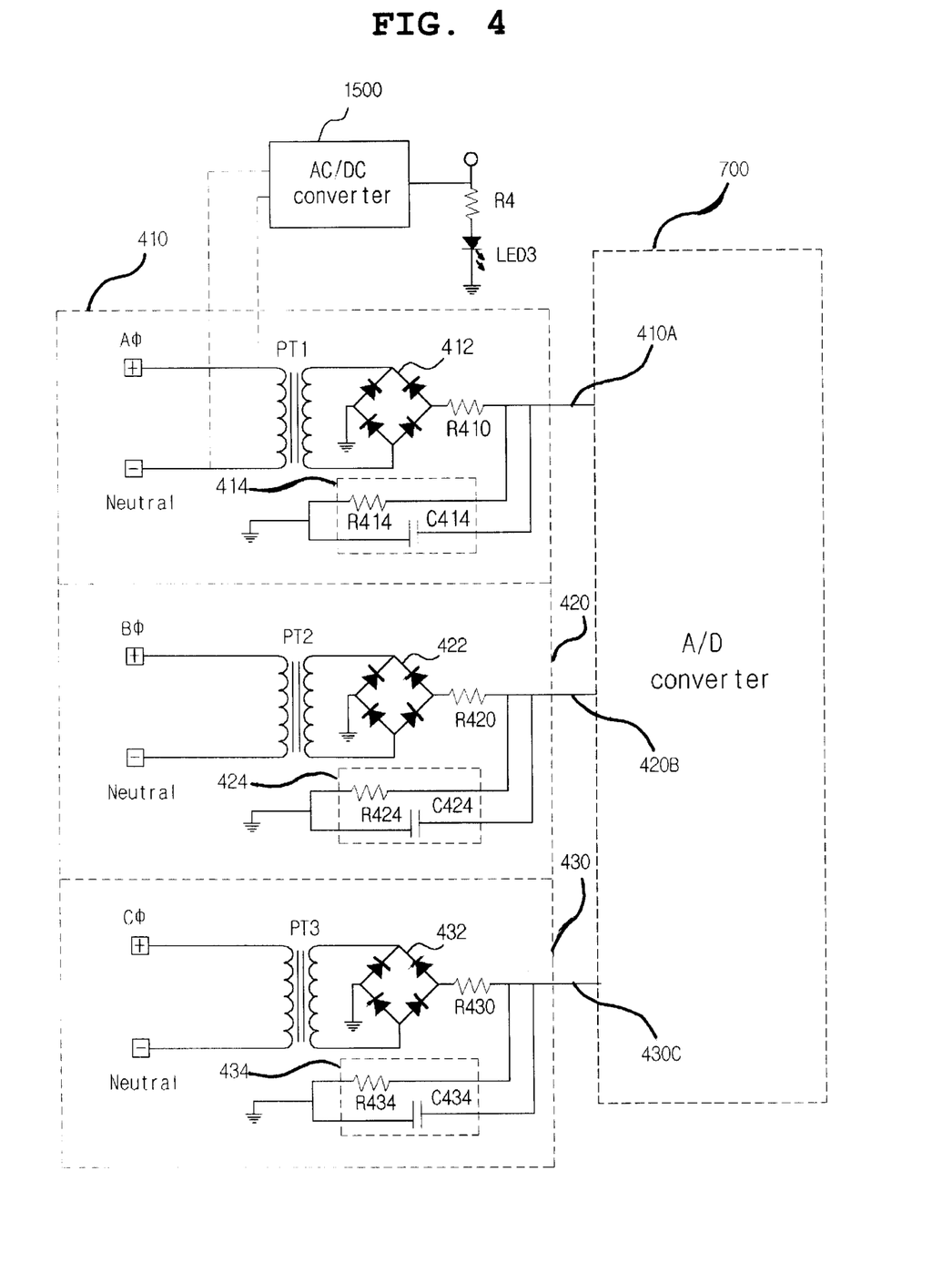
FIG. 4 is a detailed circuit diagram of a phase voltage detection unit in FIG. 2.
Figure 5:
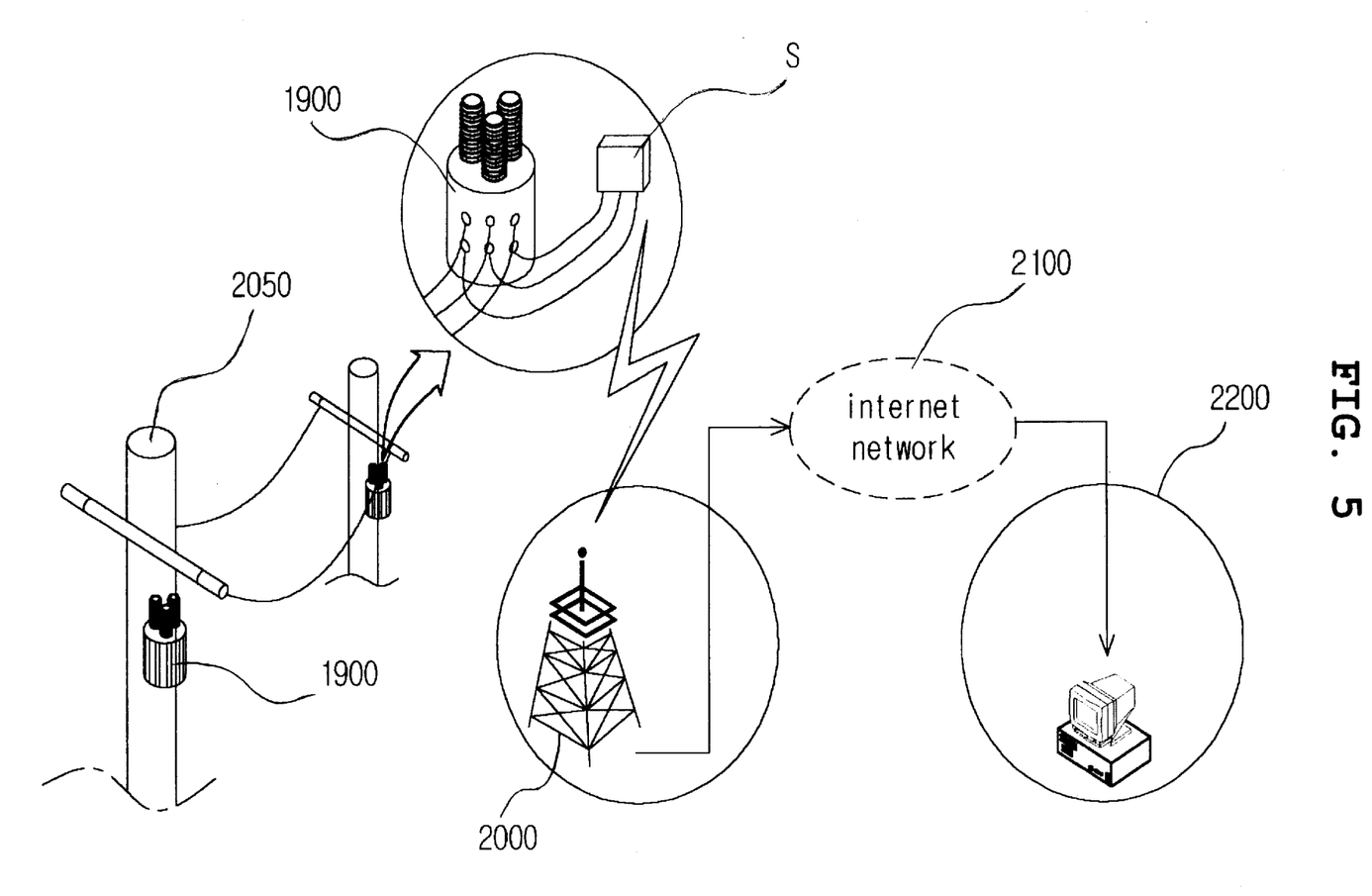
FIG. 5 is a schematic view of an exemplary example to which the present invention is applied.

FIG. 2 is a block diagram schematically showing the construction of a pole transformer load monitoring system using a wireless Internet network in accordance with a preferred embodiment of the present invention, FIG. 3 is a detailed circuit diagram of a phase current detection unit in FIG. 2, FIG. 4 is a detailed circuit diagram of a phase voltage detection unit in FIG. 2, and FIG. 5 is a schematic view of an exemplary example to which the present invention is applied.

As shown in FIGS. 2 to 5, the present pole transformer load monitoring system comprises a phase current detection unit 300 for detecting current of each phase flowing through a secondary coil of a pole transformer 1900 installed in a pole 2050, a phase voltage detection unit 400 for detecting a voltage of each phase induced in the secondary coil of the pole transformer 1900, an internal temperature detection unit 500 for detecting an internal temperature of a system body S, an external temperature detection unit 600 for detecting an external temperature of the pole transformer 1900, and an A/D converter 700 for converting the phase current detected by the phase current detection unit 300, the phase voltage detected by the phase voltage detection unit 400, the internal temperature detected by the internal temperature detection unit 500 and the external temperature detected by the external temperature detection unit 600 into digital signals. The pole transformer load monitoring system further comprises a microprocessor 800 for performing an arithmetic operation for digital phase current, phase voltage, internal temperature and external temperature data from the A/D converter 700 and controlling the entire operation of the system, a flash read only memory (ROM) 900 for sequentially storing phase current, phase voltage, internal temperature and external temperature values measured as a result of the arithmetic operation of the microprocessor 800, and a watchdog 1000 for monitoring from periodic output signals from the microprocessor 800 whether the microprocessor 800 operates normally and outputting a reset signal to the microprocessor 800 and flash ROM 900 upon determining that the microprocessor 800 does not operate normally. The pole transformer load monitoring system further comprises a buffer 1100 for buffering an address signal from the microprocessor 800, a random access memory (RAM) 1200 for storing output data from the microprocessor 800 in its location corresponding to the address signal buffered by the buffer 1100, a modem 1300 for receiving an output signal from the microprocessor 800, transmitting the received signal to a central control station 2200 via a base station 2000 and Internet network 2100, receiving a control signal transmitted from the central control station 2200 and transferring the received control signal to the microprocessor 800, an indication unit 1400 for providing a visual indication of the transmission of the output signal from the microprocessor 800 via the modem 1300 and a visual indication of the reception of the control signal from the central control station 2200 by the microprocessor 800, and an alternating current (AC)/direct current (DC) converter 1500 for converting an AC voltage applied between any one of three phases of the pole transformer 1900 and a neutral line into a DC voltage of a certain level and outputting the converted DC voltage as an operating voltage.

As employed herein "AΦ" should be construed as the designation for a first phase of a three phase electrical power transmission/distribution line, "BΦ" should be construed as the designation for the second phase and "CΦ" should be construed as the designation for the third phase.

The phase current detection unit 300 includes, as shown in FIG. 3, an AΦ current detector 310 for detecting AΦ current, a BΦ current detector 320 for detecting BΦ current, and a CΦ current detector 330 for detecting CΦ current.

The AΦ current detector 310 includes a first current transformer CT1 for detecting the AΦ current, a first bridge rectification circuit 312 for rectifying the AΦ current detected by the first current transformer CT1 by full wave to reduce an associated input width of the A/D converter 700 so as to provide a precise measurement of the detected AΦ current, an output resistor R310 connected to the output of the first bridge rectification circuit 312 for outputting AΦ DC current full wave-rectified by the first bridge rectification circuit 312, a Zener diode ZD2 for bypassing abnormal overcurrent to ground when it flows through the output of the first bridge rectification circuit 312, and a capacitor C3 connected in parallel to the Zener diode ZD2 for filtering a noise component (high frequency component) contained in the AΦ DC current full wave-rectified by the first bridge rectification circuit 312 and outputting the resulting AΦ DC current to the A/D converter 700. The BΦ current detector 320 includes a second current transformer CT2 for detecting the BΦ current, a second bridge rectification circuit 322 for rectifying the BΦ current detected by the second current transformer CT2 by full wave to reduce an associated input width of the A/D converter 700 so as to provide a precise measurement of the detected BΦ current, an output resistor R320 connected to the output of the second bridge rectification circuit 322 for outputting BΦ DC current full wave-rectified by the second bridge rectification circuit 322, a Zener diode ZD3 for bypassing abnormal overcurrent to ground when it flows through the output of the second bridge rectification circuit 322, and a capacitor C4 connected in parallel to the Zener diode ZD3 for filtering a noise component (high frequency component) contained in the BΦ DC current full wave-rectified by the second bridge rectification circuit 322 and outputting the resulting BΦ DC current to the A/D converter 700. The CΦ current detector 330 includes a third current transformer CT3 for detecting the CΦ current, a third bridge rectification circuit 332 for rectifying the CΦ current detected by the third current transformer CT3 by full wave to reduce an associated input width of the A/D converter 700 so as to provide a precise measurement of the detected CΦ current, an output resistor R330 connected to the output of the third bridge rectification circuit 332 for outputting CΦ DC current full wave-rectified by the third bridge rectification circuit 332, a Zener diode ZD4 for bypassing abnormal overcurrent to ground when it flows through the output of the third bridge rectification circuit 332, and a capacitor C5 connected in parallel to the Zener diode ZD4 for filtering a noise component (high frequency component) contained in the CΦ DC current full wave-rectified by the third bridge rectification circuit 332 and outputting the resulting CΦ DC current to the A/D converter 700.

The phase voltage detection unit 400 includes, as shown in FIG. 4, an AΦ voltage detector 410 for detecting an AΦ voltage, a BΦ voltage detector 420 for detecting a BΦ voltage, and a CΦ voltage detector 430 for detecting a CΦ voltage.

The AΦ voltage detector 410 includes a first potential transformer PT1 for detecting the AΦ D voltage, a fourth bridge rectification circuit 412 for rectifying the AΦ voltage detected by the first potential transformer PT1 by full wave, an output resistor R410 connected to the output of the fourth bridge rectification circuit 412, and a filter 414 for filtering a high frequency component contained in an output AΦ DC voltage from the output resistor R410 and outputting the resulting AΦ DC voltage to the A/D converter 700. The filter 414 is provided with a resistor R414 and capacitor C414. The BΦ voltage detector 420 includes a second potential transformer PT2 for detecting the BΦ voltage, a fifth bridge rectification circuit 422 for rectifying the BΦ voltage detected by the second potential transformer PT2 by full wave, an output resistor R420 connected to the output of the fifth bridge rectification circuit 422, and a filter 424 for filtering a high frequency component contained in an output BΦ DC voltage from the output resistor R420 and outputting the resulting BΦ DC voltage to the A/D converter 700. The filter 424 is provided with a resistor R424 and capacitor C424. The CΦ voltage detector 430 includes a third potential transformer PT3 for detecting the CΦ voltage, a sixth bridge rectification circuit 432 for rectifying the CΦ voltage detected by the third potential transformer PT3 by full wave, an output resistor R430 connected to the output of the sixth bridge rectification circuit 432, and a filter 434 for filtering a high frequency component contained in an output CΦ DC voltage from the output resistor R430 and outputting the resulting CΦ DC voltage to the A/D converter 700. The filter 434 is provided with a resistor R434 and capacitor C434.

In accordance with the teaching of the present invention, sophisticated phase current detectors and phase voltage detectors (FIG. 3 and FIG. 4) may be used in conjunction with a single phase or multiphase AC power distribution. The detector outputs appear on lines 310A, 320B, 330C, 410A, 420B and 430C, respectively and are input to the A/D converter 700.

The internal temperature detection unit 500 includes a pull-up resistor R1 for inputting a power supply voltage Vcc, a temperature sensor 500a for sensing the internal temperature of the system body S, and a capacitor Cl for filtering a noise component contained in an output signal from the temperature sensor 500a.

The external temperature detection unit 600 includes a temperature sensor 600a mounted on the outer surface of the pole transformer 1900 for sensing the external temperature of the transformer 1900, a Zener diode ZD1 for bypassing an abnormal overload voltage contained in an output signal from the temperature sensor 600a to ground, and a bypass capacitor C2 for filtering a noise component contained in the output signal from the temperature sensor 600a.

The indication unit 1400 includes a first light emitting diode LED1 for indicating the transmission of the output signal from the microprocessor 800 to the central control station 2200 via a resistor R5, the modem 1300 and the Internet network 2100, a voltage limiting resistor R2 for limiting a voltage to the first light emitting diode LED1, a second light emitting diode LED2 for indicating the reception of the control signal from the central control station 2200 by the microprocessor 800 via the Internet network 2100 and modem 1300, and a voltage limiting resistor R3 for limiting a voltage to the second light emitting diode LED2.

In FIG. 2, the reference numeral 1600, not described, denotes a reference voltage generator that generates a reference voltage in response to the power supply voltage Vcc and applies the generated reference voltage to the A/D converter 700, LED3 denotes a light emitting diode that indicates the output of the DC voltage from the AC/DC converter 1500, and R4 denotes a voltage limiting resistor that limits a voltage to the light emitting diode LED3.

A description will hereinafter be given of the operation of the pole transformer load monitoring system with the above-stated construction in accordance with the preferred embodiment of the present invention.

First, in the phase current detection unit 300, the AΦ current detector 310, BΦ current detector 320 and CΦ current detector 330 detect AΦ current, BΦ current and CΦ current and output the detection results to the A/D converter 700, respectively.

In detail, in the AΦ current detector 310, the first current transformer CT1 detects the AΦ current, which is then full wave-rectified by the first bridge rectification circuit 312 and applied to the output resistor R310. The capacitor C3 filters a noise component (high frequency component) contained in output AΦ DC current from the output resistor R310 and outputs the resulting AΦ DC current to the A/D converter 700. At this time, if abnormal overcurrent flows through the output of the first bridge rectification circuit 312, then it is bypassed to ground by the Zener diode ZD2.

In the BΦ current detector 320, the BΦ current is detected by the second current transformer CT2, full wave-rectified by the second bridge rectification circuit 322 and then applied to the output resistor R320. The capacitor C4 filters a noise component (high frequency component) contained in output BΦ DC current from the output resistor R320 and outputs the resulting BΦ DC current to the A/D converter 700. At this time, provided that abnormal overcurrent flows through the output of the second bridge rectification circuit 322, it will be bypassed to ground by the Zener diode ZD3. In the CΦ current detector 330, the CΦ current is detected by the third current transformer CT3, full wave-rectified by the third bridge rectification circuit 332 and then applied to the output resistor R330. The capacitor C5 filters a noise component (high frequency component) contained in output CΦ DC current from the output resistor R330 and outputs the resulting CΦ DC current to the A/D converter 700. At this time, provided that abnormal overcurrent flows through the output of the third bridge rectification circuit 332, it will be bypassed to ground by the Zener diode ZD4.

In the phase voltage detection unit 400, the AΦ voltage detector 410, BΦ voltage detector 420 and CΦ voltage detector 430 detect an AΦ voltage, BΦ voltage and CΦ voltage and output the detection results to the A/D converter 700, respectively.

In other words, in the AΦ voltage detector 410, the first potential transformer PT1 detects the AΦ voltage, which is then full wave-rectified by the fourth bridge rectification circuit 412 and applied to the output resistor R410. The filter 414, which includes the resistor R414 and capacitor C414, filters a high frequency component contained in an output AΦ DC voltage from the output resistor R410 and outputs the resulting AΦ DC voltage to the A/D converter 700. In the BΦ voltage detector 420, the BΦ voltage is detected by the second potential transformer PT2, full wave-rectified by the fifth bridge rectification circuit 422 and then applied to the output resistor R420. The filter 424, which is composed of the resistor R424 and capacitor C424, filters a high frequency component contained in an output BΦ DC voltage from the output resistor R420 and outputs the resulting BΦ DC voltage to the A/D converter 700. In the CΦ voltage detector 430, the CΦ voltage is detected by the third potential transformer PT3, full wave-rectified by the sixth bridge rectification circuit 432 and then applied to the output resistor R430. The filter 434, which is provided with the resistor R434 and capacitor C434, filters a high frequency component contained in an output CΦ DC voltage from the output resistor R430 and outputs the resulting CΦ DC voltage to the A/D converter 700.

In the internal temperature detection unit 500, the temperature sensor 500a senses the internal temperature of the system body S, and the capacitor C1 filters a noise component contained in an output signal from the temperature sensor 500a and outputs the resulting signal to the A/D converter 700. In the external temperature detection unit 600, the temperature sensor 600a senses the external temperature of the pole transformer 1900, and the Zener diode ZD1 bypasses an, abnormal overload voltage contained in an output signal from the temperature sensor 600a to ground. The bypass capacitor C2 filters a noise component contained in the output signal from the temperature sensor 600a and outputs the resulting signal to the A/D converter 700.

The A/D converter 700 converts the AΦ current, BΦ current and CΦ current detected respectively by the AΦ current detector 310, BΦ current detector 320 and CΦ current detector 330 in the phase current detection unit 300, the AΦ voltage, BΦ voltage and CΦ voltage detected respectively by the AΦ voltage detector 410, BΦ voltage detector 420 and CΦ voltage detector 430 in the phase voltage detection unit 400, the internal temperature of the system body S detected by the internal temperature detection unit 500 and the external temperature of the pole transformer 1900 detected by the external temperature detection unit 600 into digital signals and then outputs the converted digital signals to the microprocessor 800.

The microprocessor 800 performs an arithmetic operation for digital phase current, phase voltage, internal temperature and external temperature data from the A/D converter 700 and controls the entire operation of the system.

In other words, the flash ROM 900 sequentially stores phase current, phase voltage, internal temperature and external temperature values measured as a result of the arithmetic operation of the microprocessor 800, in the order of their measurements (detections).

The watchdog 1000 receives output signals from the microprocessor 800 at intervals of a predetermined time and monitors from the received signals whether the microprocessor 800 operates normally. Upon determining that the microprocessor 800 does not operate normally, the watchdog 1000 outputs a reset signal to the microprocessor 800 and flash ROM 900 such that the microprocessor 800 is initialized to perform the normal operation.

The buffer 1100 buffers an address signal from the microprocessor 800 and outputs the buffered address signal to the RAM 1200. The RAM 1200 stores output data from the microprocessor 800, i.e., digital phase current, phase voltage, internal temperature and external temperature data in its location corresponding to the address signal buffered by the buffer 1100. The microprocessor 800 also outputs the digital phase current, phase voltage, internal temperature and external temperature data to the modem 1300 via the resistor R5. If the modem 1300 receives the output data from the microprocessor 800, then it transmits the received data to the central control station 2200 via the base station 2000 and Internet network 2100. As a result, the central control station 2200 can monitor hystereses of loads, such as phase voltages and phase currents, on the basis of the transmitted data. The central control station 2200 can also graph load trend by time zones and print out a daily report, monthly report, quarterly report and yearly report about light-load information and overload information. The station 2200 can further generate an alarm and determine whether a pole transformer on any pole 2050 is overloaded.

Therefore, the central control station 2200 can output a control signal to an overloaded or faulty pole transformer 1900 to rapidly cope with the overloaded or faulty state, or give an alarm to a personal computer of a manager to cope with the overloaded or faulty state at once, thereby stably supplying power to consumers, estimating overload to avoid transformer explosion and sudden interruption of power supply, and tracking an accurate fault point on a distribution line to shorten a recovery time.

At this time, in the indication unit 1400, the first light emitting diode LED1 acts to indicate the transmission of the output data from the microprocessor 800 to the central control station 2200 via the resistor R5, the modem 1300 and the Internet network 2100, and the second light emitting diode LED2 acts to indicate the reception of the control signal from the central control station 2200 by the microprocessor 800 via the Internet network 2100 and modem 1300.

As apparent from the above description, the present invention provides a pole transformer load monitoring system using a wireless Internet network, which comprises a phase current detection unit for detecting current of each phase flowing through a secondary coil of a pole transformer, a phase voltage detection unit for detecting a voltage of each phase induced in the secondary coil of the pole transformer, an internal temperature detection unit for detecting an internal temperature of a system body, an external temperature detection unit for detecting an external temperature of the pole transformer, and an A/D converter for converting the detected phase current, phase voltage, internal temperature and external temperature into digital signals and outputting the converted digital signals to a microprocessor. The microprocessor performs an arithmetic operation for digital phase current, phase voltage, internal temperature and external temperature data from the A/D converter and sequentially stores the resulting measurements in a flash ROM. A watchdog is provided to monitor from periodic output signals from the microprocessor whether the microprocessor operates normally and output a reset signal to the microprocessor and flash ROM upon determining that the microprocessor does not operate normally. A buffer is provided to buffer an address signal from the microprocessor, and a RAM is provided to store output data from the microprocessor in its location corresponding to the address signal buffered by the buffer. A modem is adapted to receive an output signal from the microprocessor, transmit the received signal to a central control station via an Internet network, receive a control signal transmitted from the central control station and transfer the received control signal to the microprocessor. The indication unit functions to provide a visual indication of the transmission of the output signal from the microprocessor via the modem and a visual indication of the reception of the control signal from the central control station by the microprocessor. Therefore, the pole transformer load monitoring system according to the present invention is capable of monitoring phase voltages, phase currents, an internal temperature of a system body and an external temperature of a pole transformer in real time and providing current and voltage load factors by time zones. The present system is further capable of, when a pole transformer is overloaded, outputting an alarm to a PC of a manager and a central control station and displaying an associated image on the screen. Moreover, the present system can provide an indication of only an overloaded pole transformer. Furthermore, the present system is capable of, when a pole transformer is overloaded, readily providing transformer information (for example, light-loaded transformer information, overloaded transformer information, daily information, monthly information, quarterly information and yearly information), and tracking an accurate fault point on a distribution line to shorten a recovery time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power distribution line pole transformer load monitoring system using a wireless Internet network, comprising:

phase current detection means for detecting current of each phase flowing through a secondary coil of a pole transformer;

phase voltage detection means for detecting a voltage of each phase induced in the secondary coil of the pole transformer;

internal temperature detection means for detecting an internal temperature of a system body;

external temperature detection means for detecting an external temperature of said pole transformer;

an analog/digital converter for converting the phase current detected by said phase current detection means, the phase voltage detected by said phase voltage detection means, the internal temperature detected by said internal temperature detection means and the external temperature detected by said external temperature detection means into digital signals;

a microprocessor for performing an arithmetic operation for digital phase current, phase voltage, internal temperature and external temperature data from said analog/digital converter and controlling the an entire operation of the system;

a flash read only memory for sequentially storing phase current, phase voltage, internal temperature and external temperature values measured as a result of the arithmetic operation of said microprocessor;

a watchdog for monitoring from periodic output signals from said microprocessor whether said microprocessor operates normally and outputting a reset signal to said microprocessor and flash read only memory upon determining that said microprocessor does not operate normally;

a buffer for buffering an address signal from said microprocessor;

a random access memory for storing output data from said microprocessor in its location corresponding to the address signal buffered by said buffer;

a modem for receiving an output signal from said microprocessor, transmitting the received signal to a central control station via a base station and the Internet network, receiving a control signal transmitted from the central control station and transferring the received control signal to said microprocessor;

indication means for providing a visual indication of the transmission of the output signal from said microprocessor via said modem and a visual indication of the reception of the control signal from said central control station by said microprocessor; and an alternating current (AC)/direct current (DC) converter for converting an AC voltage applied between any one of three phases of said pole transformer and a neutral line into a DC voltage of a certain level and outputting the converted DC voltage as an operating voltage.

2. The power distribution line pole transformer load monitoring system as set forth in claim 1, wherein said phase current detection means includes:

an AΦ current detector for detecting AΦ current;

a BΦ current detector for detecting BΦ current; and a CΦ current detector for detecting CΦ current.

3. The power distribution line pole transformer load monitoring system as set forth in claim 2, wherein said AΦ, current detector includes a first current transformer for detecting the AΦ current, a first bridge rectification circuit for rectifying the AΦcurrent detected by said first current transformer by full wave to reduce an associated input width of said analog/digital converter so as to provide a precise measurement of the detected AΦcurrent, a first output resistor connected to an output of said first bridge rectification circuit for outputting AΦ DC current full wave-rectified by said first bridge rectification circuit, a first Zener diode for bypassing abnormal overcurrent to ground when it flows through the output of said first bridge rectification circuit, and a first capacitor connected in parallel to said first Zener diode for filtering a noise component (high frequency component) contained in the AΦ DC current full wave-rectified by said first bridge rectification circuit and outputting the resulting AΦ DC current to said analog/digital converter;

wherein said BΦ current detector includes a second current transformer for detecting the BΦ current, a second bridge rectification circuit for rectifying the BΦ current detected by said second current transformer by full wave to reduce an associated input width of said analog/digital converter so as to provide a precise measurement of the detected BΦ current, a second output resistor connected to an output of said second bridge rectification circuit for outputting BΦ DC current full wave-rectified by said second bridge rectification circuit, a second Zener diode for bypassing abnormal overcurrent to ground when it flows through the output of said second bridge rectification circuit, and a second capacitor connected in parallel to said second Zener diode for filtering a noise component (high frequency component) contained in the BΦ DC current full wave-rectified by said second bridge rectification circuit and outputting the resulting BΦ DC current to said analog/digital converter; and wherein said CΦ current detector includes a third current transformer for detecting the CΦ current, a third bridge rectification circuit for rectifying the CΦ current detected by said third current transformer by full wave to reduce an associated input width of said analog/digital converter so as to provide a precise measurement of the detected CΦ current, a third output resistor connected to an output of said third bridge rectification circuit for outputting CΦ DC current full wave-rectified by said third bridge rectification circuit, a third Zener diode for bypassing abnormal overcurrent to ground when it flows through the output of said third bridge rectification circuit, and a third capacitor connected in parallel to said third Zener diode for filtering a noise component (high frequency component) contained in the CΦ DC current full wave-rectified by said third bridge rectification circuit and outputting the resulting CΦ DC current to said analog/digital converter.

4. The power distribution line pole transformer load monitoring system as set forth in claim 1, wherein said phase voltage detection means includes:

an AΦ voltage detector for detecting an AΦ voltage;

a BΦ voltage detector for detecting a BΦ voltage; and a CΦ voltage detector for detecting a CΦ voltage.

5. The power distribution line pole transformer load monitoring system as set forth in claim 4, wherein said AΦ voltage detector includes a first potential transformer for detecting the AΦ voltage, a fourth bridge rectification circuit for rectifying the AΦ voltage detected by said first potential transformer by full wave, a first output resistor connected to an output of said fourth bridge rectification circuit, and a first filter for filtering a high frequency component contained in an output AΦ DC voltage from said first output resistor and outputting the resulting AΦ DC voltage to said analog/digital converter, said first filter having a first resistor and first capacitor;

wherein said BΦ voltage detector includes a second potential transformer for detecting the BΦ voltage, a fifth bridge rectification circuit for rectifying the BΦ voltage detected by said second potential transformer by full wave, a second output resistor connected to an output of said fifth bridge rectification circuit, and a second filter for filtering a high frequency component contained in an output BΦ DC voltage from said second output resistor and outputting the resulting BΦ DC voltage to said analog/digital converter, said second filter having a second resistor and second capacitor; and wherein said CΦ voltage detector includes a third potential transformer for detecting the CΦ voltage, a sixth bridge rectification circuit for rectifying the CΦ voltage detected by said third potential transformer by full wave, a third output resistor connected to an output of said sixth bridge rectification circuit, and a third filter for filtering a high frequency component contained in an output CΦ DC voltage from said third output resistor and outputting the resulting CΦ DC voltage to said analog/digital converter, said third filter having a third resistor and third capacitor.

* * * * *